Patented Apr. 17, 1923.

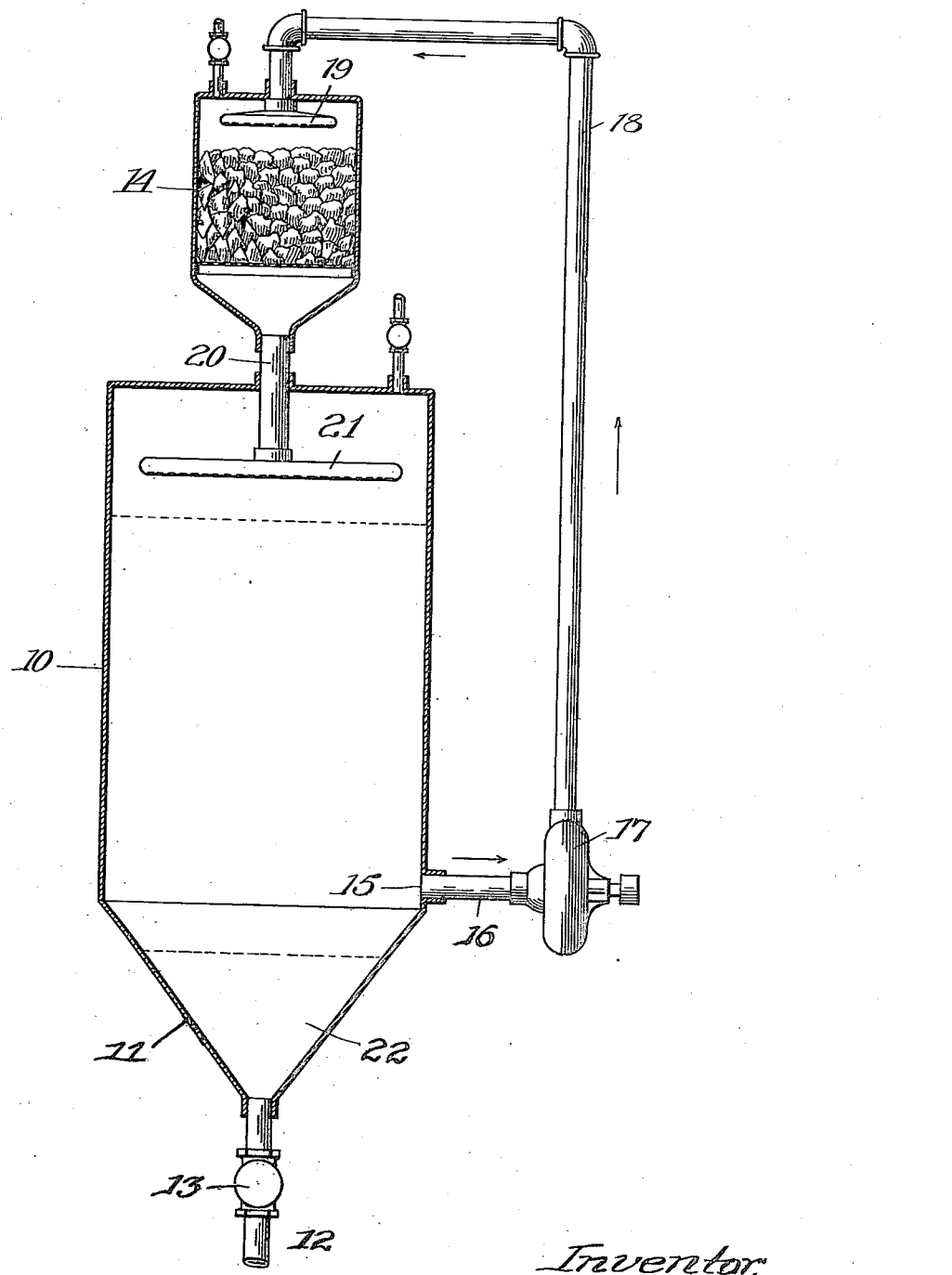

1,452,206

UNITED STATES PATENT OFFICE.

MATTHEW D. MANN, JR., OF ROSELLE, NEW JERSEY, ASSIGNOR, BY MESNE ASSIGNMENTS, TO SETH B. HUNT, TRUSTEE, OF MOUNT KISCO, NEW YORK.

MEANS FOR DEHYDRATING ALCOHOLIC LIQUIDS.

Application filed March 8, 1920. Serial No. 364,197.

*To all whom it may concern:*

Be it known that I, MATTHEW D. MANN, Jr., a citizen of the United States, residing at 120 West Fifth Ave., Roselle, in the county of Union and State of New Jersey, have invented a new and useful Means for Dehydrating Alcoholic Liquids, of which the following is a specification.

The present invention relates to the dehydration of higher alcohols, that is, of alcohols containing three or more carbon atoms, and more particularly of isopropyl alcohol. It will be clearly understood from the following description of a method of its application and from the accompanying drawings which show diagrammatically apparatus for carrying it into effect.

In the purification of isopropyl alcohol by distillation with steam or in the presence of water, it is found that a constant boiling mixture of the alcohol and water is formed containing about 9.3% by volume of water and which boils at about 80.4° C. under ordinary atmospheric pressure. Repeated distillation of the mixture results in substantially no change in its composition, unless carried out in the presence of a dehydrating agent. In accordance with the present invention a substantially complete dehydration of the alcohol may be effected.

In practicing the present invention, the concentrated isopropyl alcohol solution containing water to the extent of 2.3% or more is treated with a suitable electrolyte, such as the caustic alkalies, sodium hydroxide and potassium hydroxide. Thus sodium hydroxide may be added to the concentrated isopropyl alcohol solution referred to, the amount added being preferably about 35% of the water present in the solution; that is, about 0.4 lb. may be added per gallon of the solution. Upon treatment with the caustic soda an aqueous solution of the latter settles out from the isopropyl alcohol from which it may be readily separated. The isopropyl alcohol thus prepared is substantially anhydrous, but contains a small amount of the caustic soda in solution (about 0.½%) from which it may be removed by distillation.

Although I prefer to use the caustic soda in the proportion indicated, I have found that a less proportional quantity is sufficient to effect the dehydration of the alcohol. The quantity of caustic soda added should be, however, at least 20% of the water content of the alcohol for satisfactory dehydration of the latter. The aqueous liquid which first separates on addition of caustic, contains about 20% thereof, its concentration increasing if it is permitted to remain in contact with the alcohol. It is hence preferred that the liquid be removed as fast as it separates from the alcohol.

In carrying out the present process, although satisfactory results are readily secured by agitating the electrolyte with the isopropyl alcohol solution and permitting the aqueous solution to settle out from the dehydrated alcohol, equally efficient results may be obtained on a large scale by filtering all or part of the alcohol solution through a body of the electrolyte and then, after admixture with the remainder of the alcohol solution, separating the aqueous solution of the electrolyte from the dehydrated alcohol. In the drawing means for accomplishing this are illustrated.

Referring more particularly to the drawing, the numeral 10 indicates a large tank provided with a tapered or hopper bottom 11 terminating in a drain pipe 12 provided with a cock 13. The tank is filled with the aqueous isopropyl alcohol solution to be dehydrated. At a higher level is mounted a receptacle 14 containing the electrolyte, for example, caustic soda, preferably in lump form, and supported on a perforated plate 23.

The alcohol solution is withdrawn from tank 10 at an intermediate point 15 through pipe 16 by pump 17 and forced thru pipe 18 to sprinkler head 19, by which it is sprayed over the caustic soda. It drains through the caustic soda and passes out of receptacle 14 through drain pipe 20 into distributer head 21, by which it is distributed over the surface of the alcohol solution in the tank. An aqueous solution of the electrolyte settles out of the isopropyl alcohol, which is rapidly dehydrated, as indicated at 22, and this layer may be readily removed through the discharge pipe 12.

It is readily apparent that the admixture with the isopropyl alcohol of other higher alcohols of similar character, for example, those corresponding to the olefines of petroleum distillation gases, does not affect the operation of the invention and the treatment of such mixtures or of higher alcohols having characteristics similar to those of isopropyl alcohol is intended to be included in the scope of the accompanying invention. Furthermore, it is not intended that the specific details or theoretical opinions advanced in the present specification are to be regarded as limitations upon the scope of the invention, except in so far as included in the accompanying claims.

I claim:

1. The process of dehydrating isopropyl alcohol which consists in admixing it with caustic alkali, permitting the aqueous solution of the caustic alkali thereby formed to separate from the dehydrated alcohol and drawing off the aqueous solution.

2. The process of dehydrating a constant boiling point mixture of isopropyl alcohol and water which consists in adding thereto caustic soda in the proportion of at least 0.4 lb. per gallon of mixture, permitting the resulting aqueous caustic soda solution to settle and removing it.

3. The process of dehydrating a mixture of isopropyl alcohol and water which consists in filtering it through a body of caustic alkali, collecting the filtered material and separating the aqueous solution of the electrolyte formed from the dehydrated alcohol by stratification.

4. The process of dehydrating a mixture of isopropyl alcohol and water which consists in maintaining a bulk supply of the mixture, withdrawing a portion thereof and filtering it through a body of caustic alkali, returning the filtered mixture to the bulk supply and separating in the latter the aqueous solution of the caustic alkali thereby formed from the dehydrated alcohol by stratification.

5. The process of dehydrating a constant boiling mixture of isopropyl alcohol and water which consists in maintaining a bulk supply thereof, withdrawing a portion of said mixture, passing it through caustic soda and subsequently returning it to the bulk supply, and permitting the aqueous caustic solution thereby formed to separate from the dehydrated alcohol by stratification.

MATTHEW D. MANN, Jr.